April 23, 1963

R. W. McCLENNY ETAL 3,086,597

CULTIVATOR ATTACHMENT

Filed Feb. 9, 1962

INVENTORS
ROBERT W. McCLENNY,
HERBERT M. FAISON, JR.
BY

McMorrow, Berman + Davidson
ATTORNEYS.

April 23, 1963  R. W. McCLENNY ETAL  3,086,597
CULTIVATOR ATTACHMENT

Filed Feb. 9, 1962   3 Sheets-Sheet 2

INVENTOR.
ROBERT W. McCLENNY
HERBERT M. FAISON, JR.
BY
McMorrow, Berman & Davidson
ATTORNEYS.

April 23, 1963 R. W. McCLENNY ETAL 3,086,597
CULTIVATOR ATTACHMENT
Filed Feb. 9, 1962 3 Sheets-Sheet 3

INVENTORS
ROBERT W. McCLENNY
HERBERT M. FAISON, JR.
BY
McMorrow, Berman & Davidson
ATTORNEYS.

United States Patent Office 3,086,597
Patented Apr. 23, 1963

3,086,597
CULTIVATOR ATTACHMENT
Robert W. McClenny and Herbert M. Faison, Jr., Nansemond County, Va. (both of P.O. Box 1206, Suffolk, Va.)
Filed Feb. 9, 1962, Ser. No. 172,344
13 Claims. (Cl. 172—119)

This invention relates to a novel cultivator attachment for tractors.

The primary object of the invention is the provision of an efficient, practical, and easily installed cultivator attachment for a tractor, which is mounted to the underside of a tractor, is driven directly from a power take-off of the tractor, and is especially but not exclusively for use in the cultivation of blueberry plants, the attachment being adjustable, relative to the horizontal, for cultivating where the plants are on ridges or are hilled.

Another object of the invention is the provision of a mechanically superior and more compact attachment of the character indicated above which has a right-angle drive connection with a tractor power take-off, which operates a drive chain enclosed in a box, the box having a universal mounting to the tractor, whereby the box and a cultivator rotor housing, fixed to the box, and extending laterally therefrom, can be adjusted to different angles relative to the horizontal, without affecting the operation of the drive chain.

A further object of the invention is the provision of an attachment of the character indicated above, wherein the attachment is connected to a hydraulic lift of a tractor to be elevated from and depressed to the ground by operation of the lift, when the tractor and the attachment are to be moved from place to place with the attachment out of operation, and wherein turnbuckle means is provided for adjusting and holding the cultivator housing and its rotor in angular adjustments relative to the horizontal.

Other important objects and advantageous features of the invention will be apparent from the following description and the accompanying drawings, wherein, for purposes of illustration only, a specific form of the invention is set forth in detail.

Figure 1:
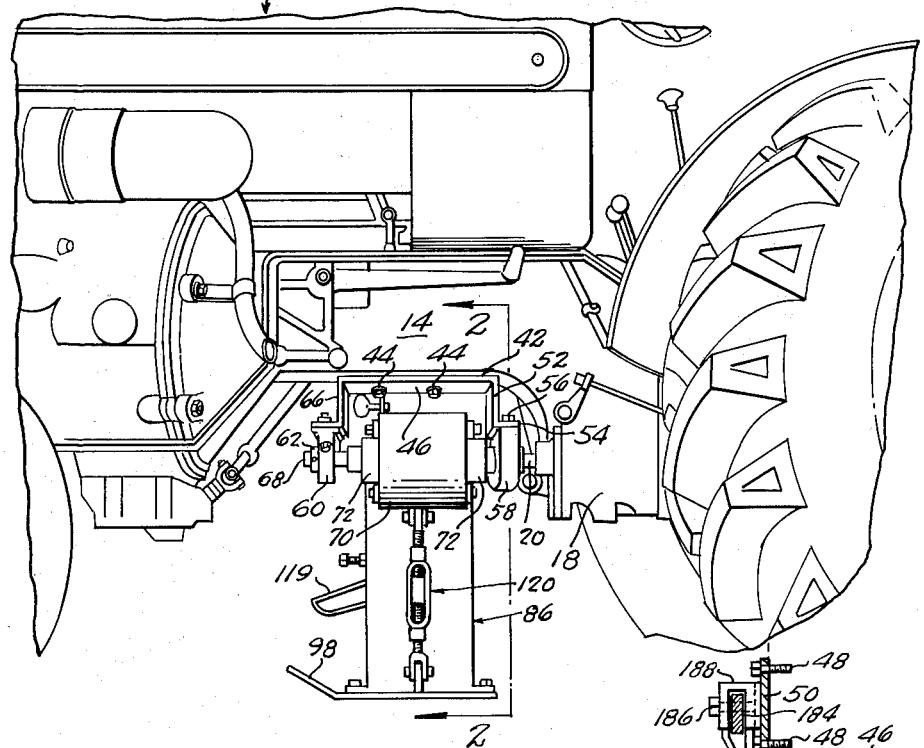
FIGURE 1 is a fragmentary left-hand perspective view of a tractor, showing an attachment of the present invention installed thereon.

Referring in detail to the drawings, wherein like numerals designate like parts throughout the several views, the illustrated cultivator attachment, generally designated 10, is shown installed on a Porsch-Diesel tractor 12, although the attachment is adapted for installation on other forms of tractors, with no or little modification of the attachment or the tractors. The tractor 12 has an intermediate chassis frame portion 14 having a side member 16. A pendant portion 18 behind the frame portion 14 has a horizontal longitudinal power take-off shaft 20 extending forwardly therefrom and spaced downwardly from the intermediate portion 14. The tractor further comprises a rear frame portion 22, on which is supportably pivoted, at 24, a rearwardly extending arm 26, to whose rear end is pivoted, at 28, a vertical hydraulic lift adjustment cylinder assembly 30, to the lower end of which is pivoted, at 32, the upper end of a vertical link 34. A generally horizontal lever 36 extends along the right-hand side of the rear frame portion 22, is pivoted, intermediate its ends, at 38, on the frame portion 22, and is pivotally connected, at its rear end, as indicated at 40, to the lower end of the link 34. The lever 36 is a component of the attachment 10.

Figure 4:
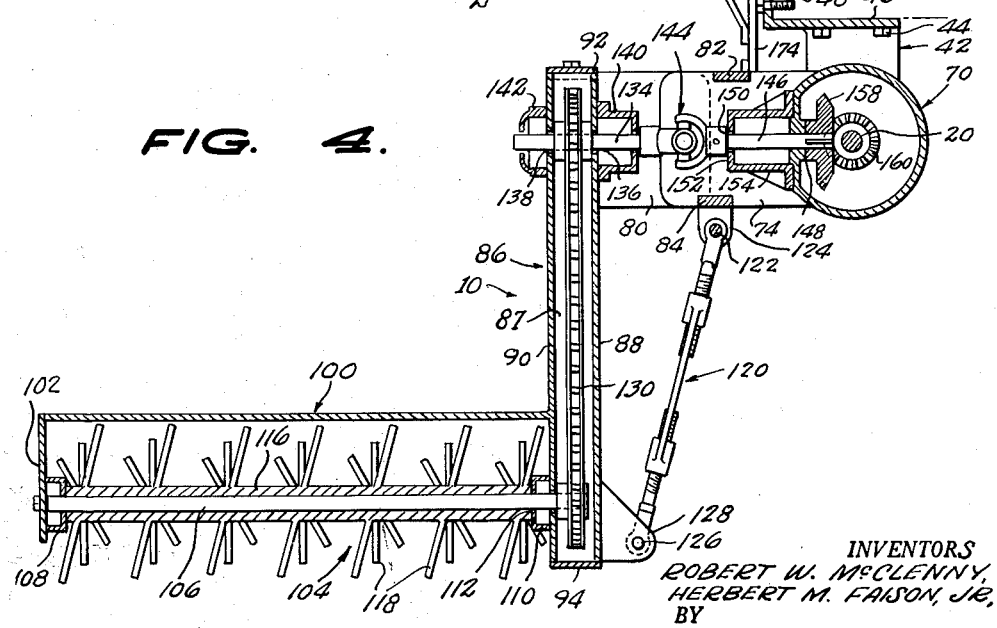
FIGURE 4 is a vertical transverse section taken on the line 4—4 of FIGURE 3.

The attachment 10 comprises an inverted U-shaped mounting bracket 42 disposed beneath and longitudinally of the side member 16 of the intermediate chassis portion 14, and secured to the side member 16, by means of bolts 44, extending through the cross member 46 of the bracket, which is engaged with the underside of the side member, and by means of bolts 48 passing through a vertical outboard flange 50, on the cross member 46, which is engaged with the outboard side of the side member 16, as shown in FIGURE 4.

Figures 2, 3:
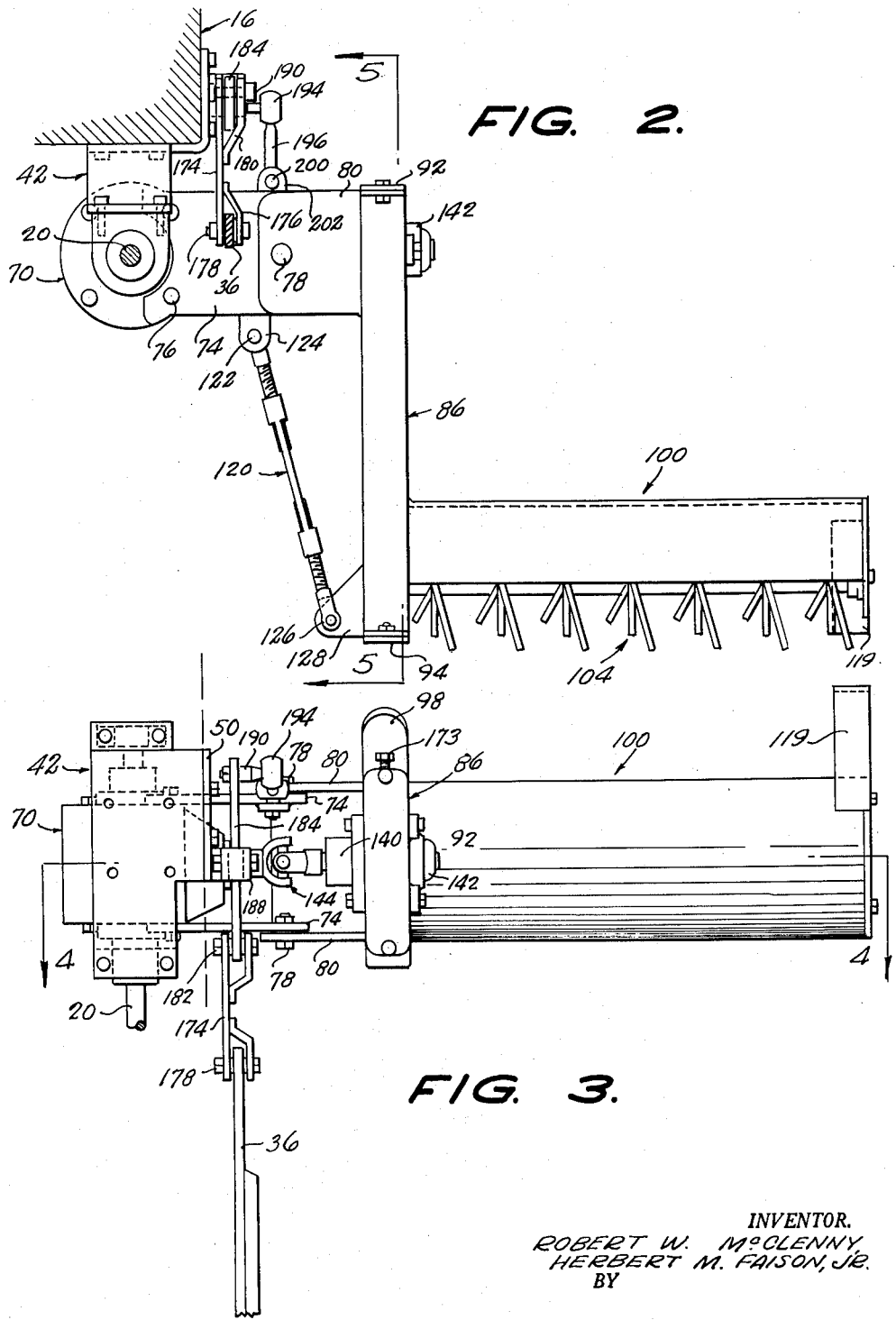
FIGURE 2 is an enlarged vertical transverse section taken on the line 2—2 of FIGURE 1.
FIGURE 3 is a top plan view of the attachment, per se.

The mounting bracket cross member 46 has a pendant rear L-shaped leg 52 to whose horizontal foot 54 is fixed, as indicated at 56, a rear pillow block bearing 58, through which the tractor power take-off shaft 20 is journaled. A front pillow block bearing 60 is fixed, as indicated at 62, to the underside of the foot 64 of a pendant L-shaped leg 66 on the forward end of the cross member 46, through which the forward end 68 of the power take-off shaft 20 is journaled. A cylindrical gear casing 70 spacedly surrounds the power take-off shaft 20 and has bearings 72, on its ends, through which the power take-off shaft extends, and has spaced laterally outwardly extending flat, vertically disposed horizontal inner arms 74 fixed on its ends, as indicated at 76, in FIGURES 2 and 3, which extend laterally outwardly from the casing 70, and are traversed, at their outer ends, by horizontal, longitudinal pivot bolts 78. Similar outer arms 80 are engaged with the outer sides of the inner arms 74 and are traversed by the pivot bolts 78. Upper and lower spacing cross members 82 and 84, respectively, extend between the inner arms 74, at their upper and lower edges. A vertically elongated rectangular chain box 86 is fixed to and extends downwardly from between the outer arms 80, at right angles thereto.

The chain box 86 has end walls 87, upper portions of which can be continuations of the outer ends of the outer arms 80, an inner side wall 88, and an outer side wall 90, the upper and lower ends of the box being closed by a removable cover plate 92 and a removable plate 94, respectively, the plate 94 having an upwardly angled ground-engaging shoe 98 on its forward end. Fixed to the outer side of the lower part of the outer side wall 90 is a horizontally elongated hollow semi-cylindrical cultivator rotor housing 100 having an outer end wall 102. A cultivator rotor 104 extends longitudinally in the housing 100 and comprises a shaft 106 journaled at its ends in an outer bearing 108, fixed to the inner side of the outer end wall 102, and an inner bearing 110 fixed to the outer side of the outer side wall 90 of the chain box 86. The inner end of the rotor shaft extends through an opening 112 provided in the outer side wall 90, and has a sprocket wheel 114 fixed thereon, within the chain box 86. The rotor 104 further comprises a sleeve 116 which is fixedly circumposed on the rotor shaft 106, with its ends bearing against the bearings 108 and 110. Spaced groups of circumferentially spaced and divergent cultivator fingers 118 are fixed to the sleeve 116, and extend below the rotor housing 100. A downwardly and forwardly angled ground-engaging shoe 119 is fixed on the outer end of the rotor housing 100.

A turn-buckle 120 is pivoted at its upper end, at 122, on a pendant lug 124 on the lower cross member 84 of the inner arms 74, and is pivoted, at its lower end, at 126, to a laterally inwardly extending ear 128 on the lower part of the inner side wall 88 of the chain box 86. The turn-buckle 120 acts as means for semi-permanent adjustment of the cultivator rotor housing 100, between horizontal position, and angled positions, so that the rotor housing 100 can be given the same angles as the sides of ridges or hills in which plants to be cultivated are planted.

Figure 5:
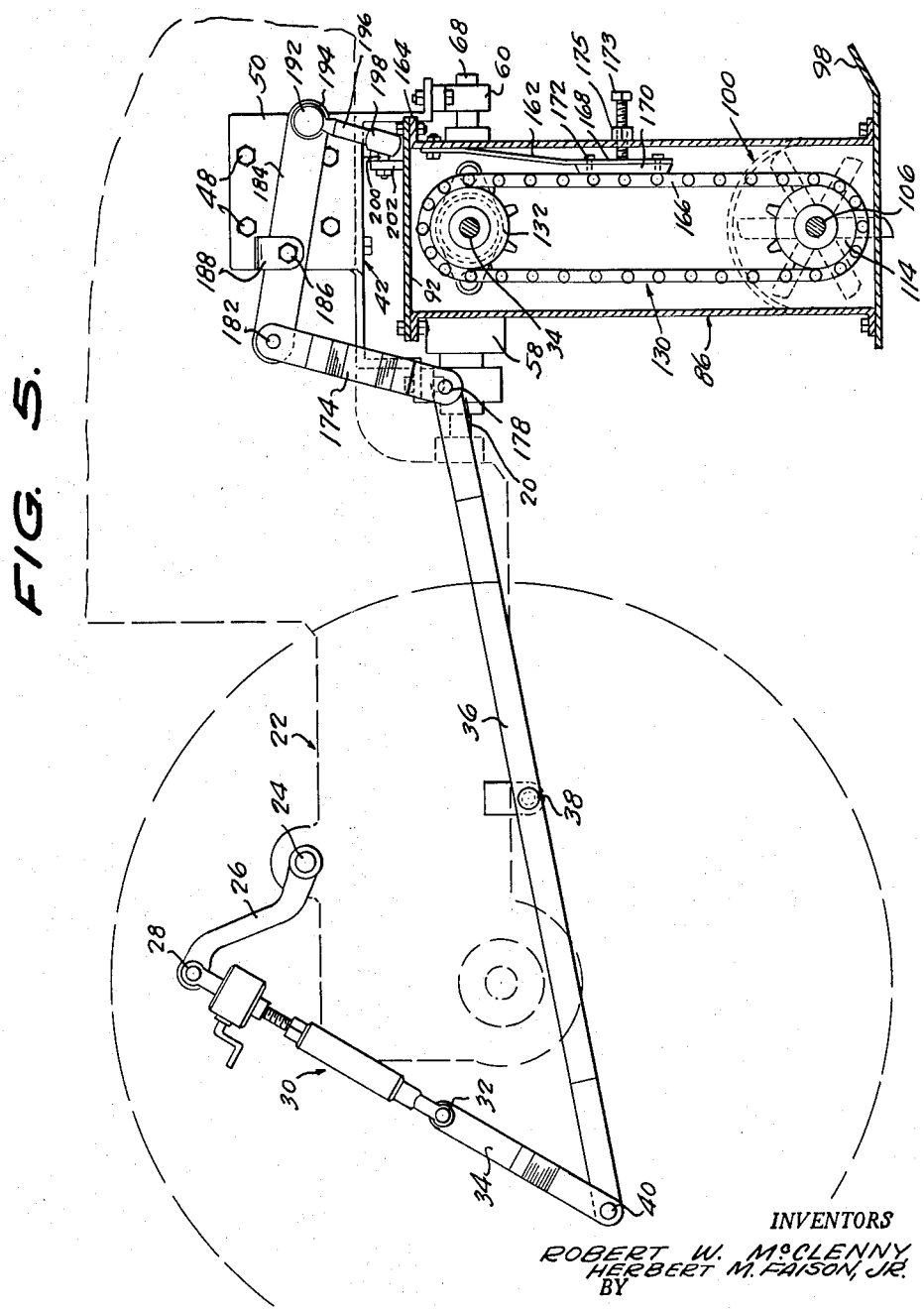
FIGURE 5 is a vertical longitudinal section taken on the line 5—5 of FIGURE 2, showing the elevating and depressing lever of the attachment connected to a power lift of the tractor.

As shown in FIGURES 4 and 5, a sprocket chain 130 is trained under the cultivator rotor shaft sprocket wheel 114, extends upwardly within the chain box 86, and is trained over a sprocket wheel 132 which is fixed on a jack shaft 134 which extends through openings 136 and 138, provided in the upper parts of the inner and outer side walls 88 and 90 of the chain box 86, these side walls having bearings 140 and 142, respectively, for the jack shaft, affixed on their outer surfaces. A universal joint 144 connects the inner end of the jack shaft 134, with the outer end of a gear shaft 146. The gear shaft 146 is journaled through a flat side portion 148 of the cylindrical gear casing 70, and extends through an opening 150 in the outer end wall 152 of a tubular arm 154 affixed to the same side of the casing 70. The gear shaft 146 has a bevel gear 158 fixed on its inner end, within the casing 70, which is in mesh with a bevel pinion 160, fixed on the power take-off shaft 20, whereby the cultivator rotor 104 is driven, through the gear shaft 146, the jack shaft 134, and the chain 130, even though the chain box 86 and the cultivator rotor housing 100 be in angular adjustments relative to the casing 70.

As shown in FIGURE 5, a tightener for the sprocket chain 130 is provided within the chain box 86, and comprises a vertically elongated resilient strap 162 which is fixed, at its upper end, as indicated at 164, to the upper part of the inner side wall of the box, is angled outwardly and downwardly toward the inner flight 166 of the chain 130 and has a vertical lower portion 168, on the outer side of which is a bearing shoe 170, which bears against the outer side of the chain flight 166, the shoe 170 being removably secured in place, as by means of screws 172 threaded through the portion 168 into the shoe. A chain tightening screw 173 is threaded through an opening in a nut 175 on the inner side wall 88 of the chain box 86, and bears against the outer side of the strap portion 168 for holding the shoe 170 against the chain flight 166.

The power lift operated arm 36, hereinabove mentioned, is operatively connected, at its forward end, for elevating and depressing the attachment 10, relative to the ground, on the axis of the power take-off shaft 20, by means of a vertical link 174 having a clevis 176, on its lower end, which embraces and is pivoted, as indicated at 178, to the forward end of the lever 36. The link 174 has a clevis 180, on its upper end, which embraces and is pivoted, at 182, to the elevated rear end of a generally horizontal rock lever 184. The rock lever 184 is pivotally supported, intermediate its ends, on a pivot bolt 186, which extends, as shown in FIGURES 4 and 5, through the arms of an inverted U-shaped member 188 which is fixed to the mounting bracket flange 50, at the rear edge thereof. A stem 190 is fixed to and extends laterally outwardly from the forward end of the rock lever 184 and has a ball 192, on its outer end, which is swivelly confined in a ball socket 194. The ball socket has a downwardly extending arm 196 which has, on its lower end, a ring 198 which loosely embraces a stud 200, which extends longitudinally and horizontally from an upstanding lug 202 on the forward inner arm 74 which is fixed to the cylindrical gear casing 70. The attachment is elevated from a depressed ground-engaging position to an out-of-the-way position, by contracting the power lift adjustment cylinder assembly 30, whereby the forward end of the lever 36 is moved downwardly, and the forward end of the rock lever 184 is elevated, so that the attachment is pulled upwardly. Expansion of the power lift adjustment cylinder assembly 30 depresses the attachment 10 from the elevated position to a ground-engaging position.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In combination, a tractor having a frame including a side member, a power take-off shaft extending along the side member, a vertical member having a laterally outwardly extending horizontal cultivator rotor housing fixed at the lower end thereof, a cultivator rotor within said housing, laterally inwardly extending arm means fixed to the vertical member pivoted on the frame side member at a location spaced laterally from the power take-off shaft, drive means comprising a component journaled on the vertical member and connected to the cultivator rotor and a component on said arm means operatively connected to the power take-off shaft, and a turnbuckle pivoted at one end to the vertical member and at its other end to the frame side member at a point inwardly of the pivotal axis of the arm means.

2. In combination, a tractor having a frame including a side member, a power take-off shaft extending along the side member, a vertical member having a laterally outwardly extending horizontal cultivator rotor housing fixed at the lower end thereof, a cultivator rotor within said housing, laterally inwardly extending arm means fixed to the vertical member pivoted on the frame side member at a location spaced laterally from the power take-off shaft, drive means comprising a component journaled on the vertical member and connected to the cultivator rotor and a component on said arm means operatively connected to the power take-off shaft, and a turnbuckle pivoted at one end to the vertical member and at its other end to the frame side member at a point inwardly of the pivotal axis of the arm means, and universal means operatively connecting the said components to each other, said universal means being aligned with the pivotal axis of said arm means.

3. In combination, a tractor having a frame including a side member, a power take-off shaft extending along the side member, a vertical member having a laterally outwardly extending horizontal cultivator rotor housing fixed at the lower end thereof, a cultivator rotor within said housing, laterally inwardly extending arm means fixed to the vertical member pivoted on the frame side member at a location spaced laterally from the power take-off shaft, drive means comprising a component journaled on the vertical member and connected to the cultivator rotor and a component on said arm means operatively connected to the power take-off shaft, and a turnbuckle pivoted at one end to the vertical member and at its other end to the frame side member at a point inwardly of the pivotal axis of the arm means, and universal means operatively connecting the said components to each other, said universal means being aligned with the pivotal axis of said arm means, said tractor having a power lift, and lever means pivoted on the frame and extending between and operatively connected to the power lift and the mounting means for hinging the mounting means on the axis of the power take-off shaft.

4. A cultivator attachment for a tractor, comprising a mounting bracket, having spaced bearings adapted to receive a tractor power take-off shaft, a gear casing positioned between the bearings and adapted to be rotatably circumposed on the power take-off shaft, inner arm means fixed on and extending laterally from the gear casing, outer arm means pivoted on the inner arm means, a pendant vertical member fixed on the outer arm means, a lateral cultivator rotor housing fixed on the vertical member at the lower end thereof, a cultivator rotor journaled in the housing, adjusting means extending between and connected to the vertical member and said inner arm means, means connected to the inner arm means for selectively rotating the gear casing about the axis of the power take-off shaft, and drive means including a first component consisting of a lateral gear shaft journaled in the gear casing and adapted to be operatively connected to the tractor power take-off shaft, said gear shaft extending along said inner arm means, a second component extending along said vertical member and operatively connected to the cultivator rotor, a third component consisting of a jack shaft journaled in said vertical member, and means universally connecting said first component to the jack shaft.

5. A cultivator attachment for a tractor, comprising a mounting bracket, having spaced bearings adapted to receive a tractor power take-off shaft, a gear casing positioned between the bearings and adapted to be rotatably circumposed on the power take-off shaft, inner arm means fixed on and extending laterally from the gear casing, outer arm means pivoted on the inner arm means, a pendant vertical member fixed on the outer arm means, a lateral cultivator rotor housing fixed on the vertical member at the lower end thereof, a cultivator rotor journaled in the housing, adjusting means extending between and connected to the vertical member and said inner arm means, means connected to the inner arm means for selectively rotating the gear casing about the axis of the power take-off shaft, and drive means including a first component consisting of a lateral gear shaft journaled in the gear casing and adapted to be operatively connected to the tractor power take-off shaft, said gear shaft extending along said inner arm means, a second component extending along said vertical member and operatively connected to the cultivator rotor, a third component consisting of a jack shaft journaled in said vertical member, and means universally connecting said first component to the jack shaft, said bracket being an inverted U-shape having a cross member adapted to be secured to a tractor frame and pendant legs carrying said bearings.

6. A cultivator attachment for a tractor, comprising a mounting bracket, having spaced bearings adapted to receive a tractor power take-off shaft, a gear casing positioned between the bearings and adapted to be rotatably circumposed on the power take-off shaft, inner arm means fixed on and extending laterally from the gear casing, outer arm means pivoted on the inner arm means, a pendant vertical member fixed on the outer arm means, a lateral cultivator rotor housing fixed on the vertical member at the lower end thereof, a cultivator rotor journaled in the housing, adjusting means extending between and connected to the vertical member and said inner arm means, means connected to the inner arm means for selectively rotating the gear casing about the axis of the power take-off shaft, and drive means including a first component consisting of a lateral gear shaft journaled in the gear casing and adapted to be operatively connected to the tractor power take-off shaft, said gear shaft extending along said inner arm means, a second component extending along said vertical member and operatively connected to the cultivator rotor, a third component consisting of a jack shaft journaled in said vertical member, and means universally connecting the said first component to the jack shaft, said rotor having a sprocket wheel, said second component consisting of a sprocket chain trained over said sprocket wheel, said jack shaft in line with the gear shaft and carrying a sprocket wheel over which said sprocket chain is trained.

7. A cultivator attachment for a tractor, comprising a mounting bracket, having spaced bearings adapted to receive a tractor power take-off shaft, a gear casing positioned between the bearings and adapted to be rotatably circumposed on the power take-off shaft, inner arm means fixed on and extending laterally from the gear casing, outer arm means pivoted on the inner arm means, a pendant vertical member fixed on the outer arm means, a lateral cultivator rotor housing fixed on the vertical member at the lower end thereof, a cultivator rotor journaled in the housing, adjusting means extending between and connected to the vertical member and said inner arm means, means connected to the inner arm means for selectively rotating the gear casing about the axis of the power take-off shaft, and drive means including a first component consisting of a lateral gear shaft journaled in the gear casing and adapted to be operatively connected to the tractor power take-off shaft, said gear shaft extending along said inner arm means, a second component extending along said vertical member and operatively connected to the cultivator rotor, a third component consisting of a jack shaft journaled in said vertical member, and means universally connecting said first component to the jack shaft, said rotor having a sprocket wheel, said second component consisting of a sprocket chain trained over said sprocket wheel, said jack shaft in line with the gear shaft and carrying a sprocket wheel over which said sprocket chain is trained.

8. A cultivator attachment for a tractor, comprising a mounting bracket, having spaced bearings adapted to receive a tractor power take-off shaft, a gear casing positioned between the bearings and adapted to be rotatably circumposed on the power take-off shaft, inner arm means fixed on and extending laterally from the gear casing, outer arm means pivoted on the inner arm means, a pendant vertical member fixed on the outer arm means, a lateral cultivator rotor housing fixed on the vertical member at the lower end thereof, a cultivator rotor journaled in the housing, adjusting means extending between and connected to the vertical member and said inner arm means, means connected to the inner arm means for selectively rotating the gear casing about the axis of the power take-off shaft, and drive means including a first component consisting of a lateral gear shaft journaled in the gear casing and adapted to be operatively connected to the tractor power take-off shaft, said gear shaft extending along said inner arm means, a second component extending along said vertical member and operatively connected to the cultivator rotor, a third component consisting of a jack shaft journaled in said vertical member, and means universally connecting said first component to the jack shaft, said rotor having a sprocket wheel, said second component consisting of a sprocket chain trained over said sprocket wheel, said jack shaft in line with the gear shaft and carrying a sprocket wheel over which said sprocket chain is trained, said vertical member comprising a chain box enclosing the chain and the sprocket wheels.

9. A cultivator attachment for a tractor, comprising a mounting bracket, having spaced bearings adapted to receive a tractor power take-off shaft, a gear casing positioned between the bearings and adapted to be rotatably circumposed on the power take-off shaft, inner arm means fixed on and extending laterally from the gear casing, outer arm means pivoted on the inner arm means, a pendant vertical member fixed on the outer arm means, a lateral cultivator rotor housing fixed on the vertical member at the lower end thereof, a cultivator rotor journaled in the housing, adjusting means extending between and connected to the vertical member and said inner arm means, means connected to the inner arm means for selectively rotating the gear casing about the axis of the power take-off shaft, and drive means including a first component consisting of a lateral gear shaft journaled in the gear casing and adapted to be operatively connected to the tractor power take-off shaft, said gear shaft extending along said inner arm means, a second component extending along said vertical member and operatively connected to the cultivator rotor, a third component consisting of a jack shaft journaled in said vertical member, and means universally connecting said first component to the jack shaft, said adjusting means being a turn-buckle.

10. A cultivator attachment for a tractor, comprising, a mounting bracket, having spaced bearings adapted to receive a tractor power take-off shaft, a gear casing positioned between the bearings and adapted to be rotatably circumposed on the power take-off shaft, inner arm means fixed on and extending laterally from the gear casing, outer arm means pivoted on the inner arm means, a pendant vertical member fixed on the outer arm means, a lateral cultivator rotor housing fixed on the vertical member at the lower end thereof, a cultivator rotor journaled in the housing, adjusting means extending between and connected to the vertical member and said inner arm means, means connected to the inner arm means for selectively rotating the gear casing about the axis of the power take-off shaft, and drive means including a first component consisting of a lateral gear shaft journaled in the gear casing and adapted to be operatively connected to the tractor power take-off shaft, said gear shaft extending along said inner arm means, a second component extending along said vertical member and operatively connected to the cultivator rotor, a third component consisting of a jack shaft journaled in said vertical member, and means universally connecting said first component to the jack shaft, said selectively rotating means comprising a lever adapted to be pivoted intermediate its ends on the tractor, a vertical link pivoted at one end to one end of said lever, a rock lever pivoted intermediate its ends on said mounting bracket and having one end pivoted to the other end of the link, a pendant arm pivoted to the other end of the rock lever being swivelly connected at its lower end to said inner arm means.

11. A cultivator attachment for a tractor, comprising a mounting bracket, having spaced bearings adapted to receive a tractor power take-off shaft, a gear casing positioned between the bearings and adapted to be rotatably circumposed on the power take-off shaft, inner arm means fixed on and extending laterally from the gear casing, outer arm means pivoted on the inner arm means, a pendant vertical member fixed on the outer arm means, a lateral cultivator rotor housing fixed on the vertical member at the lower end thereof, a cultivator rotor journaled in the housing, adjusting means extending between and connected to the vertical member and said inner arm means, means connected to the inner arm means for selectively rotating the gear casing about the axis of the power take-off shaft, and drive means including a first component consisting of a lateral gear shaft journaled in the gear casing and adapted to be operatively connected to the tractor power take-off shaft, said gear shaft extending along said inner arm means, a second component extending along said vertical member and operatively connected to the cultivator rotor, a third component consisting of a jack shaft journaled in said vertical member, and means universally connecting said first component to the jack shaft, said rotor having a sprocket wheel, said second component consisting of a sprocket chain trained over said sprocket wheel, said jack shaft in line with the gear shaft and carrying a sprocket wheel over which said sprocket chain is trained, said vertical member comprising a chain box enclosing the chain and the sprocket wheels, said pendant arm having a ring on its lower end, and a lateral pin fixed on said inner arm means about which said ring is loosely engaged.

12. A cultivator attachment for a tractor, comprising a mounting bracket, having spaced bearings adapted to receive a tractor power take-off shaft, a gear casing positioned between the bearings and adapted to be rotatably circumposed on the power take-off shaft, inner arm means fixed on and extending laterally from the gear casing, outer arm means pivoted on the inner arm means, a pendant vertical member fixed on the outer arm means, a lateral cultivator rotor housing fixed on the vertical member at the lower end thereof, a cultivator rotor journaled in the housing, adjusting means extending between and connected to the vertical member and said inner arm means, means connected to the inner arm means for selectively rotating the gear casing about the axis of the power take-off shaft, and drive means including a first component consisting of a lateral gear shaft journaled in the gear casing and adapted to be operatively connected to the tractor power take-off shaft, said gear shaft extending along said inner arm means, a second component extending along said vertical member and operatively connected to the cultivator rotor, a third component consisting of a jack shaft journaled in said vertical member, and means universally connecting said first component to the jack shaft, said vertical member having a ground-engaging shoe on its lower end.

13. A cultivator attachment for a tractor, comprising a mounting bracket, having spaced bearings adapted to receive a tractor power take-off shaft, a gear casing positioned between the bearings and adapted to be rotatably circumposed on the power take-off shaft, inner arm means fixed on and extending laterally from the gear casing, outer arm means pivoted on the inner arm means, a pendant vertical member fixed on the outer arm means, a lateral cultivator rotor housing fixed on the vertical member at the lower end thereof, a cultivator rotor journaled in the housing, adjusting means extending between and connected to the vertical member and said inner arm means, means connected to the inner arm means for selectively rotating the gear casing about the axis of the power take-off shaft, and drive means including a first component consisting of a lateral gear shaft journaled in the gear casing and adapted to be operatively connected to the tractor power take-off shaft, said gear shaft extending along said inner arm means, a second component extending along said vertical member and operatively connected to the cultivator rotor, a third component consisting of a jack shaft journaled in said vertical member, and means universally connecting said first component to the jack shaft, said vertical member having a ground-engaging shoe on its lower end, and a ground engaging shoe on the cultivator rotor housing at the end thereof remote from the vertical member.

References Cited in the file of this patent

UNITED STATES PATENTS

| | | |
|---|---|---|
| 1,953,394 | Clapper | Apr. 3, 1934 |
| 2,327,590 | Bower | Aug. 24, 1943 |
| 2,502,730 | Koch | Apr. 4, 1950 |
| 2,777,272 | Smith et al. | Jan. 15, 1957 |
| 2,974,616 | Pawela | Mar. 14, 1961 |
| 2,989,127 | Oertle | June 20, 1961 |